United States Patent
Redpath

(10) Patent No.: US 6,256,672 B1
(45) Date of Patent: Jul. 3, 2001

(54) METHOD AND SYSTEM FOR EFFICIENTLY NOTIFYING AN INFORMATION COPY RECIPIENT IN AN ELECTRONIC MAIL SYSTEM

(75) Inventor: Richard J. Redpath, Cary, NC (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/190,793

(22) Filed: Nov. 12, 1998

(51) Int. Cl.[7] .................................................... G06F 15/16
(52) U.S. Cl. ............................................ 709/232; 709/206
(58) Field of Search .................................. 709/200, 232, 709/206

(56) References Cited

U.S. PATENT DOCUMENTS

| | | | |
|---|---|---|---|
| 5,632,018 | * 5/1997 | Otorii | 709/200 |
| 5,771,355 | * 6/1998 | Kuzma | 709/232 |
| 5,781,901 | * 7/1998 | Kuzma | 707/10 |
| 5,903,723 | * 5/1999 | Beck et al. | 707/10 |
| 6,101,320 | * 8/2000 | Schuetze et al. | 709/206 |
| 6,101,531 | * 8/2000 | Eggleston et al. | 709/206 |

\* cited by examiner

*Primary Examiner*—Krisna Lim
(74) *Attorney, Agent, or Firm*—A. Bruce Clay; Myers Bigel Sibley & Sajovec, P.A.

(57) ABSTRACT

A new addressee line identifier is added to an electronic mail message. By utilizing this identifier, defined as "attachment data not included", one may provide an information copy of a note that preserves the style of the actual full note without including underlying attachment data. This allows an e-mail sender to notify additional addressees of what has been sent to the primary addressee without slowing done transmission time or wasting storage space by including unneeded and possibly quite large attachment files.

12 Claims, 4 Drawing Sheets

METHOD AND SYSTEM FOR EFFICIENTLY NOTIFYING AN INFORMATION COPY RECIPIENT IN AN ELECTRONIC MAIL SYSTEM

FIELD OF INVENTION

This invention relates in general to computer software, and in particular to a method and system for providing an e-mail notification process to reduce data mailings to additional mail recipients.

BACKGROUND OF THE INVENTION

Electronic mail applications for clients such as e-mail on the Internet provide a means for sending and receiving mail. It is possible to add attachments to electronic mail which may comprise relatively large files that add to transmission time and utilize much storage space. It is well known in the art to provide user options for sending copies of mail to others for information purposes, for example, the CC: function is frequently used to notify someone other than the intended recipient that an attachment has been sent. When this technique is used the mail note as well as the attachment is sent to the intended recipient as well as to each person copied. Sometimes this is the desired result, however, it is equally likely that a notification party merely needs to know that an attachment has been sent. Thus, despite the actual need, under the currently known techniques, the entire note and all attachments will be sent. Thus there is a need to reduce the amount of data being sent to others that are listed as copied.

SUMMARY OF THE INVENTION

Accordingly, an object of the present invention is to provide a method to send mail containing attachments without the attachment data to those that are listed as notification only.

Another object of the invention is to provide a network efficient means for sending mail to multiple parties.

Yet another object of the subject invention is to provide a visual indication of attachments without the necessity of including the attachment data in the mail. This provides a more efficient way to send copies without the unnecessary underlying data. The present invention preserves the style of the original note as well as providing an efficiency enhancement, as it is no longer necessary to create a separate note without the attachment data.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE INVENTION

Figure 1:
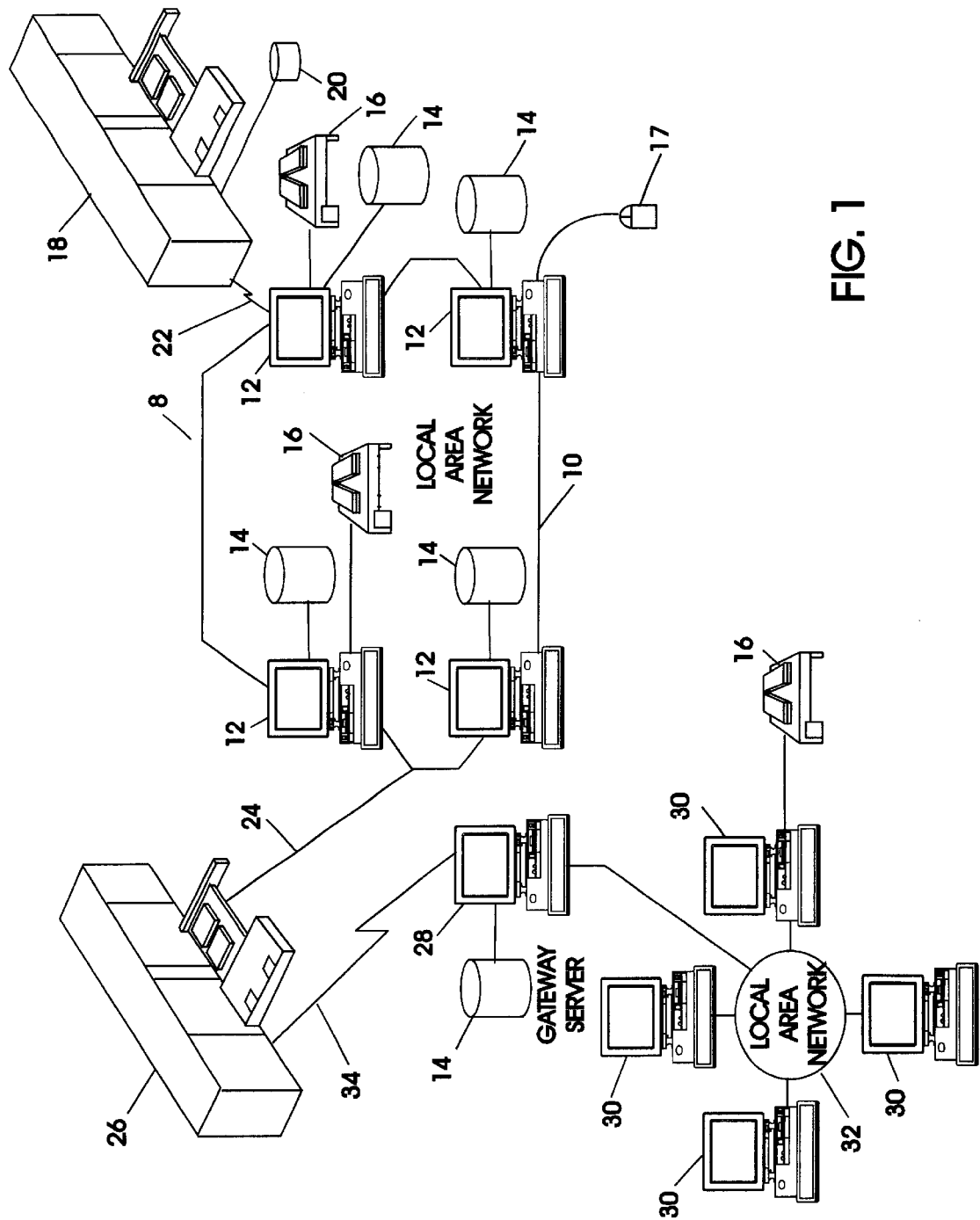
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2A:
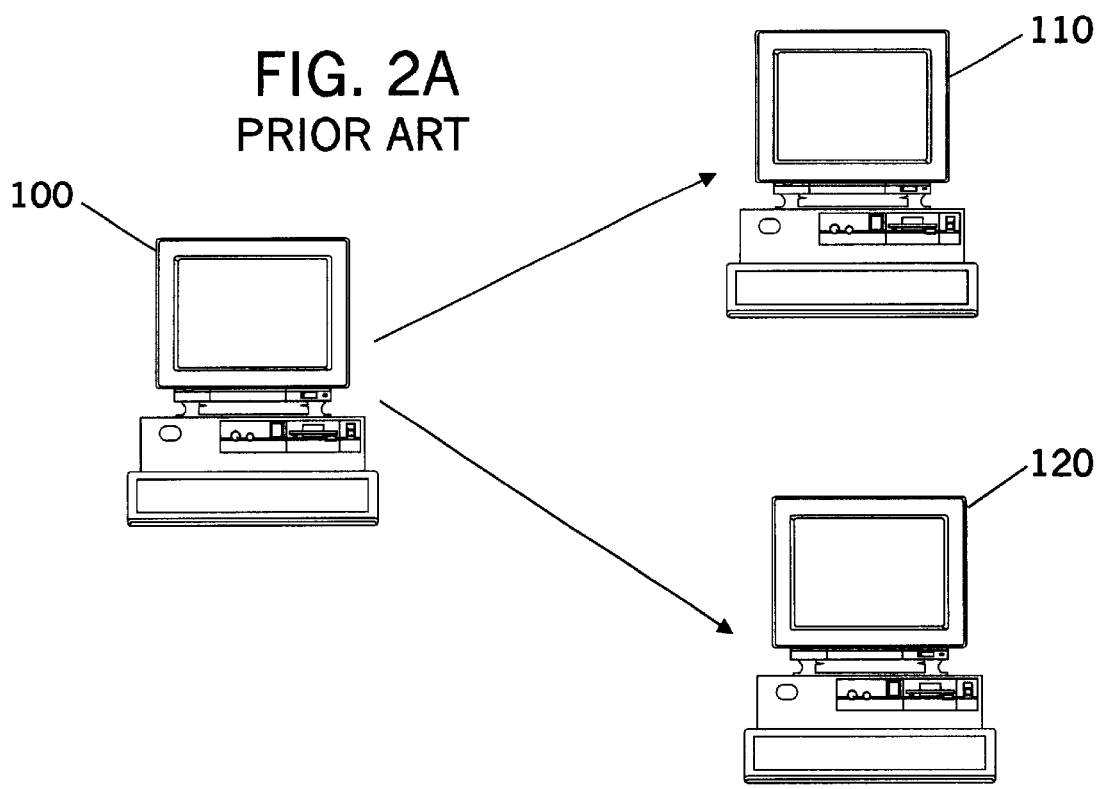
FIGS. 2A and 2B illustrate an e-mail sending scenario in accordance with the prior art.
Figure 2B:
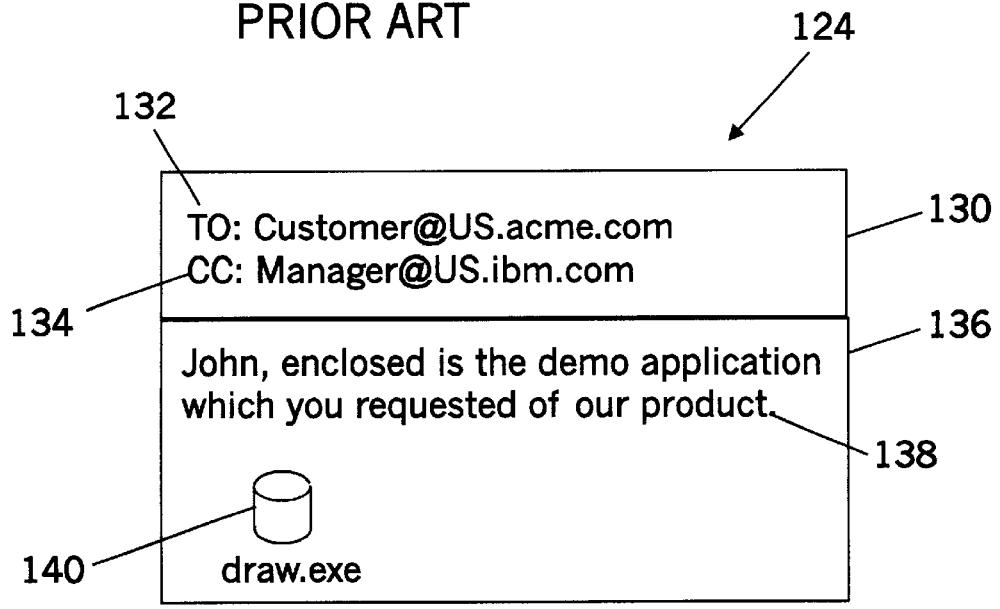

Referring now to FIGS. 2A and 2B, a prior art method of sending a note and an attachment to multiple parties is illustrated. An e-mail client 100 sends mail to his Manager 110 and to a Customer 120. An e-mail document 124 comprises, for example, an address section 130 and a body section 136. The address section 130 may include a "TO:" line 132 (as shown herein addressed to the Customer 120) and a "CC:" line 134 (as shown herein addressed to the Manager 110). As can also be seen in FIG. 2B, the document 124 includes attachment data represented by an attachment icon 140 shown in the body section 136.

The Manager 110 and the Customer 120 have both been sent the note indicating completion of the requested task as well as the actual data represented by the attachment icon 140. Since the only purpose in sending the Manager 110 the e-mail document 124 was for notification that a request from the Customer 120 was performed by the e-mail client 100, unnecessary time and storage space has been used due to the inefficiency of this prior art method.

Figure 3:
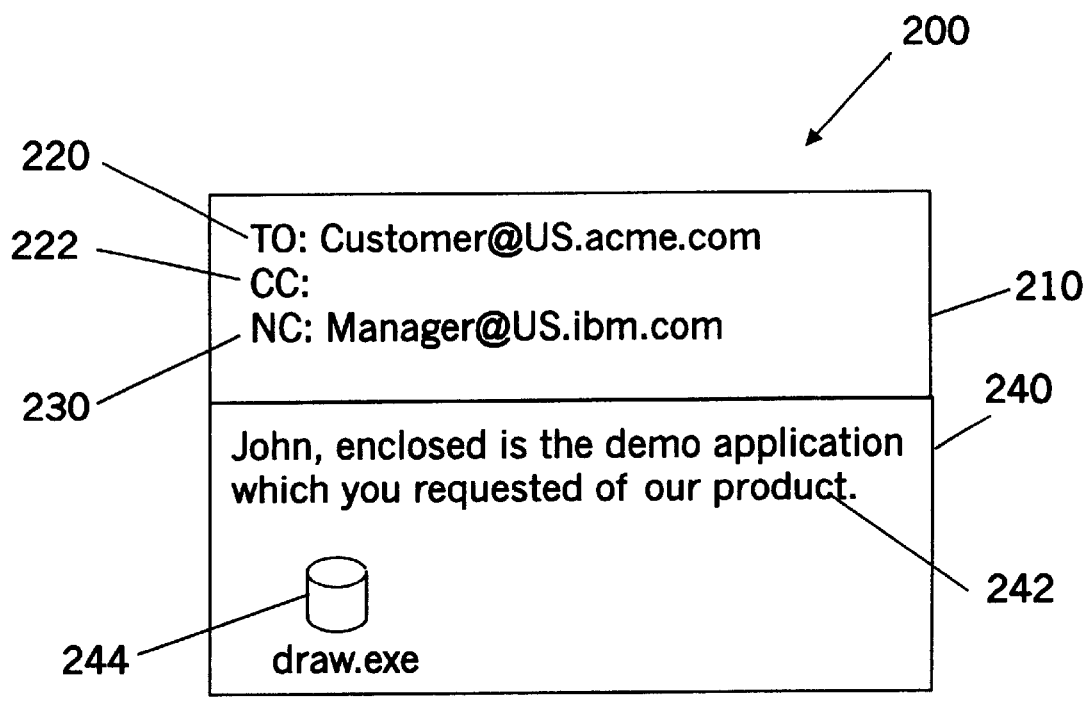
FIG. 3 illustrates the use of a notify copy in accordance with the present invention.

Referring to FIG. 3, an e-mail document 200 is shown in accordance with the present invention. An address section 210 now includes a standard "TO:" line 220 (as shown herein addressed to the Customer 120, FIG. 2A), a standard "CC:" line 222 (as shown herein not addressed) and a new "NC:" line 230 (as shown herein addressed to the Manager 110, FIG. 2A). As with the prior art method shown in FIG. 2B, the "TO:" line 220 recipient will receive the complete e-mail document 200 with message 242 and all underlying attachment data indicated by attachment icon 244. Although no addressee is indicated in the "CC:" line 222, the same information would be sent to any addressee listed therein as per the "TO:" line 220 in accordance with the prior art.

The present invention adds an "NC:"0 line 230. As shown herein, the "NC:" line 230 is addressed to the Manager 110 (see FIG. 2A). Unlike the prior art, a copy of the e-mail document 200 will be sent to the addressee in the "NC:" line 230 without the underlying attachment data but with the attachment icon 244. Thus, utilizing the present invention, the client can inform his or her manager (or any other addressee) that an appropriate response has been sent (perhaps to a customer) as well as what the response included without actually including any underlying attached data. Therefore, no storage space or download time will be unnecessarily wasted sending redundant/unneeded materials.

Figure 4:
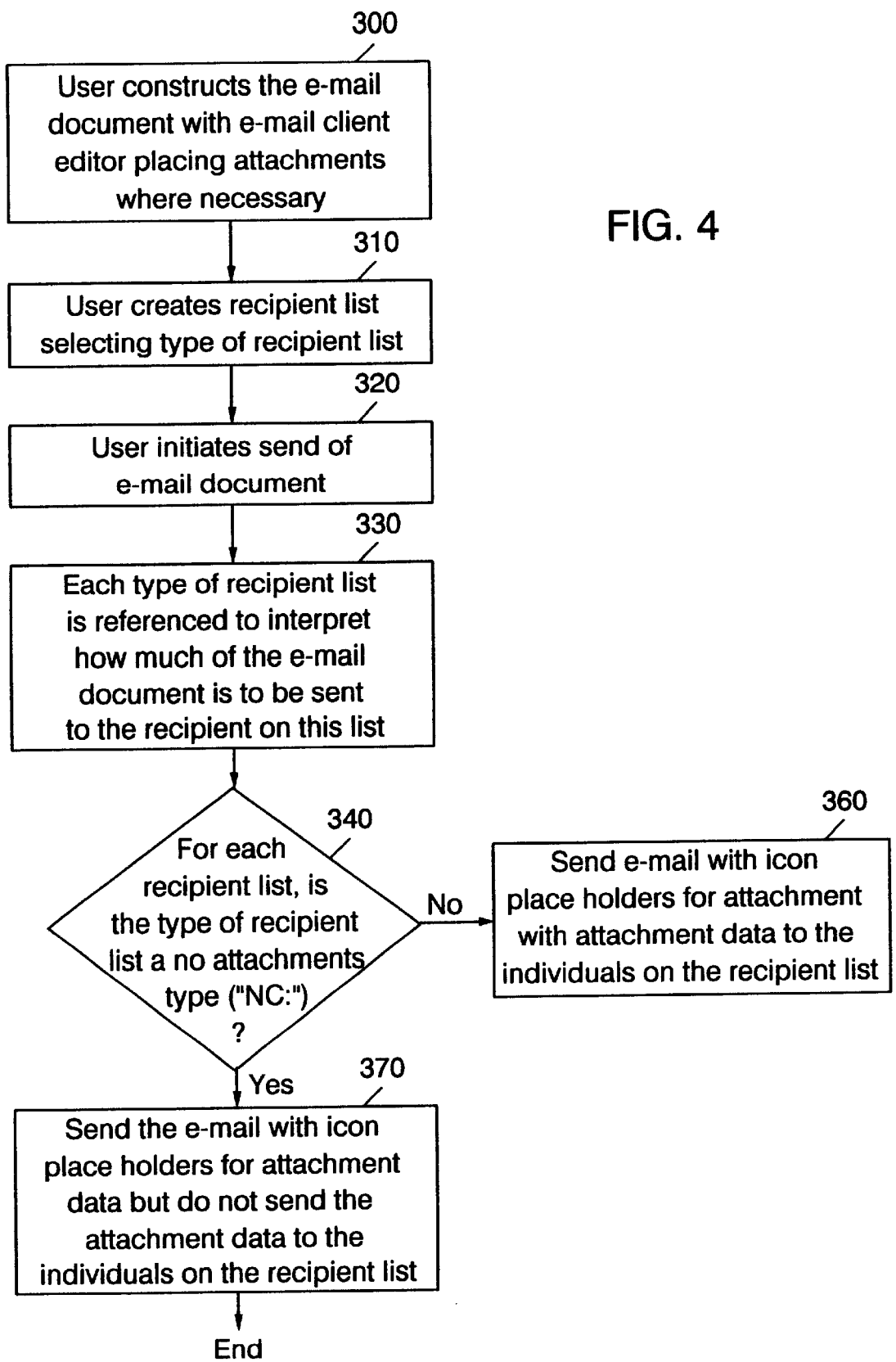
FIG. 4 is a flowchart illustrating the present invention.

Referring to FIG. 4, a flowchart illustrates the process for efficiently sending e-mail with attachments in accordance with the present invention. At block 300, the user constructs the e-mail document with an appropriate e-mail editor and places attachments where necessary. At block 310, the user creates a recipient list and selects the appropriate type of recipient (i.e.., as used herein, for example only, "TO:", "CC:", or "NC:"). At block 320, the user initiates a send of the e-mail document. Each type of recipient list is referenced at block 330 to interpret how much of the e-mail document is to be sent to the recipient on the list. At decision block 340, it is determined whether or not (for each recipient list) the recipient list is a no attachments type (i.e., an "NC:" type). If the response to decision block 340 is no, at block 360 the present invention sends the e-mail with an icon placeholder with the attachment data to the individual(s) on the recipient list. If the response to decision block 340 is yes, at block 370 the present invention sends the e-mail with an icon place holder only and does not send the attachment data to the individual(s) on the recipient list. Thus, the present invention provides the advantage of allowing a user to send underlying attachment data to only those needing the data while still allowing others to be informed of what has been sent.

Although the present invention has been described with respect to a specific preferred embodiment thereof, various changes and modifications may be suggested to one skilled in the art and it is intended that the present invention encompass such changes and modifications as fall within the scope of the appended claims.

What I claim is:

1. A method of sending e-mail messages, the method comprising the steps of:

including an identifier for each intended recipient of an e-mail message that is to receive attachment data associated with the e-mail message;

sending the e-mail message with the attachment data to a recipient having the identifier; and sending the e-mail message without the attachment data to a recipient not having the identifier.

2. The method of claim 1 wherein the step of including an identifier comprises:

including a first identifier for the recipient who is to receive the attachment data; and including a second identifier for the recipient who is not to receive the attachment data.

3. The method of claim 1, wherein the step of sending the e-mail message with the attachment data to a recipient having the identifier comprises sending an e-mail message including the attachment data in an icon placeholder to the recipient having the identifier.

4. The method of claim 2, wherein the step of sending the e-mail message without the attachment data to a recipient not having the identifier comprises sending an e-mail message including an icon placeholder without the attachment data to the recipient not having the identifier.

5. A system for sending e-mail messages, comprising:

means for including an identifier for each intended recipient of an e-mail message that is to receive attachment data associated with the e-mail message;

means for sending the e-mail message with the attachment data to a recipient having the identifier; and means for sending the e-mail message without the attachment data to a recipient not having the identifier.

6. The system of claim 5, wherein the means for including comprises:

means for including a first identifier for the recipient who is to receive the attachment data; and means for including a second identifier for the recipient who is not to receive the attachment data.

7. The system of claim 5, wherein the means for sending the e-mail message without the attachment data to a recipient not having the identifier comprises means for sending an e-mail message including an icon placeholder without the attachment data to the recipient not having the identifier.

8. The system of claim 5, wherein the means for sending the email message without the attachment data to a recipient not having the identifier comprises means for sending an e-mail message including an icon placeholder without the attachment data to the recipient not having the identifier.

9. A computer program product for sending e-mail messages comprising a computer-readable storage medium having computer-readable program code embodied in the medium, the computer-readable program code comprising:

computer-readable program code that includes an identifier for each intended recipient of an e-mail message that is to receive attachment data associated with the e-mail message; and computer-readable program code that sends the e-mail message with the attachment data to a recipient having the identifier and that sends the e-mail message without attachment data to a recipient not having the identifier.

10. The computer program product of claim 9, wherein the computer-readable program code that includes an identifier comprises:

computer-readable program code that includes a first identifier for the recipient who is to receive the attachment data and that includes a second identifier for the recipient who is not to receive the attachment data.

11. The computer program product of claim 9, wherein the computer-readable program code that sends the e-mail message sends an e-mail message including an icon placeholder including the attachment data to the recipient having the identifier.

12. The computer program product of claim 10, wherein the computer-readable program code that sends the e-mail message sends an e-mail message including an icon placeholder without the attachment data to the recipient not having the identifier.

\* \* \* \* \*